United States Patent Office 3,414,440
Patented Dec. 3, 1968

3,414,440
GAMMA MANGANESE DIOXIDE, METHOD OF PREPARING AND DRY CELL TYPE BATTERY EMPLOYING GAMMA TYPE MANGANESE DIOXIDE
William G. Moore, Midland, Mich., assignor to The Dow Chemical Company, Midland, Mich., a corporation of Delaware
No Drawing. Filed Sept. 2, 1964, Ser. No. 394,068
14 Claims. (Cl. 136—107)

This invention relates to manganese dioxide and more particularly relates to a novel gamma form of manganese dioxide; to the method of preparing said novel manganese dioxide, including a novel method of chemically preparing conventional gamma manganese dioxide equivalent to that prepared electrolytically; and to an improved battery article employing said novel manganese dioxide as a depolarizer.

A dry cell type battery (Leclanché cell) as commonly known ordinarily comprises a cylindrically shaped, internally gel coated, zinc cannister as an anode containing a physical admixture comprising, ammonium chloride and water as an electrolyte, carbon for conductivity, and a depolarizing agent of, for example, gamma manganese dioxide. This physical mixture is packed or tamped around a centrally disposed carbon cathode rod. Such a battery, though being highly useful and mobile, suffers the disadvantage that its effectiveness and efficiency is short lived. This is due primarily to the low activity of the manganese dioxide and, accordingly, to the incomplete use of only about 45 to 50 percent of the electron producing mixture in the cell. On the other hand, cells made employing the novel gamma manganese dioxide of the present invention are significantly longer lived and more effective as to utilization of said electrolyte.

An object of the present invention, therefore, is to provide a novel and improved form of gamma manganese dioxide having special utility in the manufacture of dry cell type batteries.

A further object is to provide a novel form of gamma manganese dioxide which is characterized by the occluded presence therein of micron sized particles of carbon.

Another object of the invention is to provide a novel method of preparing said novel gamma manganese dioxide.

Another object of the invention is to provide a novel gamma manganese dioxide having improved depolarizing properties for use in a Leclanché type dry cell battery.

A further object is to provide a novel method of preparing conventional gamma manganese dioxide which is equivalent to that presently made electrolytically.

A further object is to provide as an article of manufacture an improved dry cell type battery having a markedly longer effective life than heretofore obtained in conventional ordinary dry cells.

In general, the above and other objects and advantages are obtained by means of the process of the present invention for preparing said novel gamma manganese dioxide which comprises—reacting with chlorine an aqueous manganese salt solution in the presence of micron sized carbon particles, while maintaining the pH of the resulting chlorinated solution within a particular acidic range. The manganese salt, substantially free of impurities, is selected from the group consisting of manganese sulfate and manganese chloride. The reaction is terminated preferably just prior to its completion, thereby to form a slurry of a dense, highly active, substantially uncontaminated, novel gamma manganese dioxide crystalline product containing occluded carbon. This product is separated by, for example, centrifuging said slurry followed by washing and drying.

Most, if not all, of the conventional gamma manganese dioxide presently used in batteries is produced electrolytically inasmuch as heretofore no completely satisfactory chemical method of preparing has been devised. Modification of the present process, however, also provides a satisfactory and novel method of producing (in addition to the novel carbon-containing $MnO_2$ as described hereinbefore) even conventional gamma manganese dioxide by the simple modification of carrying out the reaction without the benefit of (that is, in the absence of) the carbon or other seed particles, that is, carrying out the reaction leaving out said seed particles from the reaction mixture. In so doing, a conventional but high quality gamma form of manganese dioxide may be prepared (termed hereinafter as chemically made conventional-gamma $MnO_2$) which is in general equivalent in battery and other performance features to the same made by the aforementioned electrolytic method. However, since the novel gamma manganese dioxide composition of the present invention, that is, containing occluded carbon, is so much superior even to the conventional gamma manganese dioxide made chemically as described, as will be shown more fully hereinafter, its production and use is preferred.

The novel gamma manganese dioxide product made by the process of the present invention when the carbon seed is used (termed herein as novel gamma manganese dioxide) comprises dense porous particles, high in purity, having a high specific surface, and a spongy physical form, and is further identified by a chain-like structure, said chain-like particles being characterized specifically by a nucleus of occluded carbon of the type defined hereinafter. Though not normally visibly apparent from, for example, a micrograph of the novel gamma manganese dioxide crystals produced by the method of the present invention, the occluding presence of said carbon therein may be readily shown and evidenced by dissolving such $MnO_2$ crystals in a carbon-free solvent, for example, of hydrochloric acid, followed by analyzing the resulting solvent solution for carbon by, for example, a combustion analysis techhnique. The presence of the carbon is thus readily shown as apparently being derived from its occlusion in the product.

When the novel gamma manganese dioxide product of the present invention (that is, occluded with carbon) is used in preparing dry cells (Leclanché type cells), then tested and compared with similar cells employing conventional depolarizing agents and even with, for example, cells prepared using Shawinigan carbon black only in a physical admixture, they exhibit a markedly longer effective life and a higher initial EMF as will be shown hereinafter in the examples.

In preparing the novel gamma manganese dioxide product in accordance with the present invention, the reaction is normally carried out in a closed agitated vessel wherein the manganese salt is present in a solution in an amount of from about 5 to about 30 percent by weight. This solution, at a temperature of from about 25° C. to about 80° C., preferably about 50°–70° C., is then seeded with micron sized carbon particles or other seed particles as will hereinafter be discussed of, for example, approximately 0.1 micron in size in an amount of from about 1.5 to about 10 percent, based on the dry weight of the final manganese dioxide product.

Any conventional agitation means may be employed in the reactor in practicing the invention to stir the reaction mass, such as, for example, an electrically driven anchor type stirrer.

The carbon seed material to be used in the present invention to prepare the novel product must be of the type characterized by a chain-like structure, such as, for example, so-called "Shawinigan carbon black" made by the high temperature decomposition of acetylene gas. If desired, the present novel gamma manganese dioxide may itself also be used as a seed material instead of the Shawinigan carbon. For example, the novel gamma $MnO_2$ made at the lower temperatures within the range specified hereinbefore may be used as seed in the preparation of novel gamma $MnO_2$ made at a higher temperature within the above-specified range. Inasmuch as said low temperature novel $MnO_2$ has good physical properties, for example, high specific surface and high EMF, its use as a seed at said higher temperature reaction produces a gamma $MnO_2$ lower in initial EMF but high in density, thus producing a longer battery life.

So-seeded, the manganese salt solution is reacted with chlorine gas which is introduced into the reactor, for example, by bubbling, while also introducing (concurrently, but separately) a neutralizing agent to the chorinated, thus acidic, solution in an amount sufficient to maintain the apparent pH therein between about 0.5 to about 3. In general, the neutralizing agent employed must be one which will not form an insoluble or inseparable precipitate with the manganese salt being employed. For example, magnesium hydroxide may be employed preferably when manganese sulfate is being reacted since it forms a soluble reaction by-product. Similarly, when manganese chloride is being reacted, calcium hydroxide may be used. Though neutralizing agents containing Group I metals (Mendeleff Periodic Chart) may be used to prepare the present novel gamma $MnO_2$, their use is preferably to be avoided since some of these Group I metals resultantly appear in the lattice of the novel $MnO_2$ product, thus causing an undesirable reduction in the overall effectiveness of said product.

As aforesaid, even though it is possible in the present invention to carry the reaction thereof to completion and still produce a quality novel gamma $MnO_2$ product, as a practical matter the reaction is terminated just prior to completion such that a small amount of manganese salt is left unreacted. This procedure or technique insures that the $MnO_2$ product will not become contaminated with permanganate ion ($MnO_4$), which ion forms when chlorination is continued while the manganese salt supply is depleted, whereupon, the chlorine oxidizes the dioxide product to said permanganate ion.

After the reaction of the present invention is terminated (prior to consumption of all the manganese salt as described above), regardless of the embodiment employed, the precipitate product formed is then separated from the liquid phase of the reaction mass by, for example, filtration or centrifuging. So-separated, the product is washed, for instance with a neutral or slightly alkaline washing solution at, for example, room temperature (25° C.), having a pH of about 7 to 9 then dried either in air or preferably by heating at a temperature within the range of from about 80° to about 110° C., or at some other suitable temperature and time such that the free water (uncombined water) is reduced to preferably below about 2 to 3 percent. A magnesium hydroxide solution with a pH, for example, of about 8 is preferred as a washing medium.

With respect to the embodiment of the present invention whereby conventional gamma manganese dioxide is chemically prepared to obtain a product equivalent in performance to conventional gamma manganese dioxide electrolytically prepared, the foregoing reaction already described is carried out under the same conditions with the exception of modification that no carbon or carbon-containing seed material is employed. A beneficial effect, however, is obtained if this modified reaction is seeded with an amount within the ranges previously stated for other seed materials of the conventional gamma manganese dioxide particles themselves. Therefore, this so-called modified reaction may be carried out in two ways—(a) in the absence of carbon or carbon-containing seed particles or (b) in the presence of seed particles of the conventional gamma manganese dioxide particles themselves. In either case a conventional gamma manganese product is obtained, being chemically prepared, which is at least equivalent in overall battery performance to conventional gamma manganese dioxide prepared electrically.

The novel gamma mangnese dioxide product of the present invention as previously stated has special utility as a depolarizer in dry cell type batteries in that it provides cells characterized, for example, by a markedly high initial EMF and a significantly longer shelf life, depending on the various conditions under which the product was prepared.

In general, such dry cell type batteries (Leclanché type cells) conventionally comprise a gel lined metallic anode cannister (commonly of zinc) having a carbon cathode electrode symmetrically spaced from and disposed therein. Between said anode and cathode is tamped or packed an electrolyte mixture of ammonium chloride and water of a paste like consistency and containing, for example, gamma form manganese dioxide as a depolarizing agent for depolarizing the cathode. In addition these ingredients are in a physical admixture with carbon for conductivity, for example, with the Shawinigan carbon which is also used in the present invention. So packed, the cell is topped with an impervious sealing material leaving a portion of the cathode rod extending out of and beyond said seal as the positive cell terminal being normally provided a metallic cap for better electrical contact.

In dry cell batteries prepared employing the present novel gamma manganese dioxide product as a depolarizer, however, the Shawinigan carbon is not only present in a physical admixture with the electrolyte but is present as occlusions of said carbon particles in the manganese dioxide depolarizer. This occluded presence of carbon in the depolarizer in accordance with the present invention markedly increases the efficiency of said depolarizer and promotes the more efficient use of the electrolyte mixture, thereby providing a new and improved battery article having the outstanding properties hereinbefore discussed and which are further illustrated in the examples.

The following examples are illustrative of the various embodiments of the present invention and of the utility of the product produced by the methods thereof in providing a battery article of superior quality and performance heretofore unknown. These examples, therefore, are exemplary of the invention and should not be construed as limiting the invention.

Examples I, II, and III illustrate the inventive method of the present invention for preparing the present novel gamma manganese dioxide product under the various reaction conditions of the invention.

Example I

To a 60 gallon glass lined reactor vessel equipped with anchor type stirrer and jacketed by a steam coil for temperature control, was added about 63 liters of a 72 grams per liter $MnSO_4$ solution while chlorine gas was bubbled through for about 5 minutes to saturate the contents. The stirrer was rotated at about 88 r.p.m. and the temperature of the reactor contents was held within the range of from about 52° to 54° C. A slurry of 280 grams of Shawinigan carbon black in 7 gallons of water was then added through a sampling tube. After saturation had been reached with the chlorine, $Mg(OH)_2$ was added at a rate of about 19 grams per minute (as a slurry of 95 grams $Mg(OH)_2$ per liter) while chlorination was continued so as to establish and maintain a pH value in the reactor of about 1.0 to 1.1. During the 6 hour running time, about 16 pounds of the present novel gamma $MnO_2$ product was produced. The reaction was terminated and the additions stopped, except for the chlorine which was allowed to run about 15 minutes longer. A total of about 9 pounds of chlorine was used. After chlorination was terminated the precipitate product was then recovered by filtration on a wheel and washed using water until the solution effluent showed a pH of about 6. The product was then dried and tested and found to have the following analysis and properties:

| | |
|---|---|
| $MnO_2$ | percent__ 89.1 |
| Manganese | do____ 56.6 |
| Gm./in.$^3$ | 10 |
| Carbon black in product | percent__ 2.66 |
| Square meters per gram of specific surface | 48.0 |
| EMF at pH 5.0 | mv__ 970 |

The product so-obtained was then subjected to a Kornfeil cell test to determine the time required to discharge a constant volume ½″ DIA x ½″ pellet thereof at a constant current of 50 ma./sq. cm. to cut off voltages of 1.4 volts, 1.2 volts and 1.0 volt. The Kornfeil test is well known test procedure to determine times required to discharge a Kornfeil sized cell to various voltage levels. The Kornfeil cell itself is constructed of polystyrene and when assembled consists of a small tablet of the depolarizing mix to be tested saturated with electrolyte, a carbon electrode in contact with said mix and a zinc electrode immersed in electrolyte which is in contact with the depolarizing mix. AC current may be used. The depolarizing mix itself consists of 8 parts of the dry $MnO_2$ to be tested and 1 part Shawinigan black together with a minimum of grinding action. The electrolyte solution comprises:

| | |
|---|---|
| $NH_4Cl$ | g./l__ 280 |
| $ZnCl_2$ | g./l__ 145 |
| Tergitol–4 (a wetting agent manufactured by Carbide & Carbon Chemicals Corp.) drops per 10 ml__ | 1 |

The product of this example when Kornfeil tested showed the following times in minutes required to discharge the cell to the individual voltages.

Volts:
1.4 _____ 30
1.2 _____ 68
1.0 _____ 116

This may be compared with the times obtained from testing conventional gamma $MnO_2$ made electrolytically as follows:

Volts:
1.4 _____ 15
1.2 _____ 52
1.0 _____ 69

From a comparison of the values it can readily be seen that the cell made from the depolarizing mix containing the present novel gamma manganese dioxide occluded with carbon is significantly longer lived than that using conventional manganese dioxide.

Example II

To a 22 liter, round bottom, multinecked, vessel was added 4 liters of a 21.8 grams per liter solution of $MnCl_2$ and 3 grams of Shawinigan carbon black. The vessel and contents were then heated by means of a heating mantle to 70° C. and stirred at 300 r.p.m. using an electrically powered glass stirring rod tipped with a ⅛″ x 1½″ x 4″ piece of Teflon. Thereafter 12.5 mil. increments of a 127 grams per liter $MnCl_2$ solution and also 70 ml. increments of a 91 grams per liter solution of Ca(OCl)Cl were metered into the vessel by means of rotometers. The Ca(OCl)Cl stock solution had been previously prepared by passing chlorine gas through an excess lime slurry. Such a solution is commonly known as bleach liquor. If desired, however, the lime could be added to the reaction vessel directly and chlorine bubbled through the reaction mixture. The chlorine formed from the reaction mixture and the air over said mixture was removed during operation by a suction line and passed through a lime scrubber, whereupon, more bleach liquor was formed for further use. The proportion of ingredients added was calculated such to establish and maintain a pH in the reactor of from about 1.0 to about 1.5. The reaction was carried on for about 2 hours, whereupon, it was terminated and the mixtured cooled and filtered to recover the precipitate product. So-filtered, the precipitate was then washed with water until only a trace of chloride remained in the wash water. About 181 grams of the present novel gamma $MnO_2$ dry product was obtained after drying for 16 hours at 105° C. The recovered product assayed as follows:

| | |
|---|---|
| $MnO_2$ | percent__ 94.2 |
| Mn | do____ 58.3 |
| Shawinigan carbon | do____ 1.5 |
| Gram/in.$^3$ | 7.8 |
| Square meters of specific surface per gram | 11.6 |

The novel $MnO_2$ product of this example when used as a depolarizer in A sized battery cells which prepared and then subjected to both a high and low drain test showed the following:

| Test | Time in Hours to Reach | |
|---|---|---|
| | 1.0 volt | 1.13 volts |
| High drain (at 16.7Ω) | 6.2 | |
| Low drain (at 167Ω) | | 175 |

This may be compared to the time values obtained under similar test conditions when A sized cells using conventional electrolytic gamma $MnO_2$ were tested as follows:

High drain, 7.2 hours; low drain, 149 hours.

Example III

This example was run similar to that of Example II except that a 60 gallon vessel was used and the reaction run at 35°–36° C. The $MnCl_2$ used was a 181 grams per liter solution metered into the vessel in 70.5 ml. per minute, whereas the Ca(OCl)Cl stock solution (147 grams per liter) was metered in 290 ml. per minute. 50 grams of Shawningan carbon was used. The reaction was started by first adding 10 gallons of water and heating to 35° C., whereupon, the carbon black was added and the contents stirred at 88 r.p.m. After 3 minutes the Ca(OCl)Cl solution was added as indicated. The reaction mixture was periodically sampled and tested during operation to ensure a slight excess of manganese ion (1.6 to 3.2 grams per liter excess) in solution. The pH was held at about 1.3 to 1.5 during the reaction addition time of 5¼ hours. The $MnO_2$ product (5.15 lbs.) was recovered by filtration, washed, and dried for 24 hours at 96° C. The product assayed at:

| | |
|---|---|
| $MnO_2$ | percent__ 87.0 |
| Mn | do____ 59.5 |
| Shawinigan carbon | do____ 2.1 |
| Grams/in.$^3$ | 11.2 |
| Square meters of specific surface per gram $MnO_2$ | 48.3 |

A drain test conducted on A sized cells prepared using the novel gamma $MnO_2$ product of this example showed the following:

High drain, 6.8 hours; low drain, 172 hours.

Moreover, after some of the batteries had been stored for 4 months then subjected to a low drain test, the following was revealed:

Low drain after 4 months shelf storage—166 hours.

Example IV

This example illustrates an embodiment of the present invention wherein the reaction process as specified is carried out, except that no seed of material of any kind is employed, to chemically prepare a conventional gamma manganese dioxide product which is at least equivalent in performance and properties to the conventional electrolytically made gamma $MnO_2$ and having a high specific surface and EMF. The reaction was started by adding 144 liters of a 10.4 grams per liter of Mn (as $MnSO_4$) to a 60 gallon reactor vessel which was closed except for feed and purge lines. The $MnSO_4$ solution so-added was then agitated while bubbling $Cl_2$ through it to saturate said solution and purge it of air. After purging for about 30 minutes 186 ml. per minute of a 54.5 grams per liter $Mg(OH)_2$ slurry was added thereto by use of a rotometer (10 grams of $Mg(OH)_2$ per minute). A pH of from about 2 to 3 was maintained in the reactor during the addition time of 4½ hours at room temperature. After the additions were stopped, agitation was continued and the vessel and contents heated to about 90° C. while purging it of chlorine with air for 30 minutes. The vessel was then allowed to cool over night without agitation, whereupon, the content was filtered and the recovered precipitate of gamma $MnO_2$ washed by a series of decantations and settlings, then finally filtered. 5.2 pounds of product was recovered after drying at 80° C. for 12 hours which assayed dry as follows:

| | |
|---|---|
| $MnO_2$ _____percent__ | 95.7 |
| Mn _____do____ | 59.6 |
| Grams/in.³ _____ | 18.0 |
| Square meters of specific surface per gram _____ | 110.0 |
| EMF at pH 5.0 _____mv__ | 765 |

It can readily be seen that the gamma $MnO_2$ product of this example provides a high specific surface and high EMF value. This can be compared with an electrolytic gamma $MnO_2$ product which exhibits a typical EMF under the same conditions of 710 mv. and a specific surface of 52 square meters per gram.

Example V

A similar reaction was carried out as in Example IV except using smaller quantities, a 22 liter reaction vessel, and a 1 hour reaction period. The $MnO_2$ precipitate product was removed from the reaction mixture by filtration washed with portions of deionized water. The salt free gamma $MnO_2$ recovered was then dried at 110° C. and assayed to be 92.6 percent $MnO_2$ and 60.0 percent Mn, having a density of about 10 grams per cubic inch and a specific surface of 139 square meters per gram.

Example VI

This example serves to show that even when preparing conventional gamma type manganese by means of the present process, a beneficial effect may be obtained by seeding the reaction of said process with the conventional gamma $MnO_2$ product chemically prepared. In this example, a gamma $MnO_2$ is obtained having a high specific surface and high EMF. Accordingly, a 60 gallon reactor vessel was filled with 68 liters of a 70 grams per liter solution of manganese (as $MnSO_4$) and then 2 liters of water and 1.5 pounds of gamma $MnO_2$ added thereto and the mixture heated to about 82° C. Chlorine was then bubbled through the solution to saturate it, whereupon, 200 ml. per minute of a 95 grams per liter solution of $Mg(OH)_2$ was added to establish and maintain a pH in the reaction of 1.8. After a total of 6 hours addition time had elapsed, the reactor and contents were purged with air over night. So-purged, the precipitate of gamma $MnO_2$ which had formed during the reaction was separated from the solution by filtration, washed on a wheel until the wash water indicated a pH of 8 and then dried for 16 hours at 110° C. 16 pounds of the gamma $MnO_2$ product was obtained which assayed as follows:

| | |
|---|---|
| $MnO_2$ _____percent__ | 90.2 |
| Mn _____do____ | 58.3 |
| Grams/in.³ _____ | 26.3 |
| Square meters of specific surface per gram _____ | 11.3 |
| EMF at pH 5.0 _____mv__ | 790 |

Example VII

This example is illustrative of one embodiment of the present invention wherein the reaction (and product) is seeded with some of the novel gamma manganese dioxide product itself containing occluded carbon (rather than with the Shawinigan carbon black alone). The product so-obtained is characterized such that when used as a depolarizer it produces a battery having a markedly higher EMF than batteries using conventional electrolytically prepared gamma $MnO_2$.

In this example 1000 mls. of a 70 grams per liter solution of $MnSO_4$ were placed in a 2000 ml., 3 necked flask, then heated to about 62° C. with a heating mantle while being rapidly stirred as chlorine gas was bubbled through the solution. The pH of the solution was established at 1.7. After about ¾ of an hour the $MnSO_4$ solution was seeded with 2 grams of the aforesaid carbon occluded $MnO_2$. An 80 grams per liter slurry of $Mg(OH)_2$ was then slowly added through a graduated funnel for a period of 45 minutes, whereupon, the pH rose to 2.6 and the temperature dropped to 58° C. Chlorination was continued at the same rate until 10 minutes after the completion of the $Mg(OH)_2$ addition. Whereupon, the pH again was established at 1.7 and the reading terminated. The seed material had been added about 5 minutes before the $Mg(OH)_2$ addition was started. The reaction mixture was cooled and the chlorine purged with air and the $MnO_2$ product separated therefrom by filtration and washed with water until the washings showed a pH of 4.7. The novel gamma $MnO_2$ so-separated was then dried for 16 hours at 112° C. to a final product weight of 38 grams which showed the following assay:

| | |
|---|---|
| Mn _____percent__ | 60.0 |
| $MnO_2$ _____do____ | 87.1 |
| Carbon _____do____ | 0.138 |
| Grams/in.³ _____ | 9.7 |
| EMF at pH 5.0 _____mv__ | 720 |

Table I below is a tabular compilation of the average results of several tests on the novel gamma manganese dioxide product produced by the present invention wtih respect to various properties thereof including battery performance properties. When these properties are compared, for example, the accepted specification for military requirements, also given in Table I, for battery grade gamma manganese dioxide (MIL SPEC SCL-3175, a commonly known and industrially used specification), it is readily apparent that the present novel product more than meets such requirements. Thus, it is highly desirable for use in dry cell type batteries.

TABLE I

| Property | Typical | MIL SPEC SCL-3175 |
|---|---|---|
| Absorbed moisture as percent $H_2O$ | <3 max | 3 max. |
| Available oxygen as percent $O_2$ | 91 | 85 min. |
| Total manganese as percent Mn | 60 | 58 min. |
| pH | 4.5 | 4-7. |
| Iron as percent Fe | 0.1 max | 0.25 max. |
| Lead as percent Pb | 0.005 max | 0.25 max. |
| Total heavy metal (other) | 0.01 max | 0.05 max. |
| Total alkali metals | 0.2 max | 0.5 max. |
| Total alkaline earth metals | 0.1 max | 0.5 max. |

Example VIII

To illustrate the outstanding battery utility of the present novel product, various A size cells were prepared (a) using the novel carbon seed $MnO_2$ of the present invention in some of the cells, (b) electrolytic gamma $MnO_2$ in some, and (c) natural ore $MnO_2$ in others, all as depolarizers. These cells were made as follows. A dry mixture was prepared comprising 80 percent $MnO_2$, 12 percent ammonium chloride, and 8 percent carbon black. To insure uniformity, each mixture in an amount sufficient to make several cells was ball milled for about 20 minutes at a speed of about 72 r.p.m. using ¾ inch pebbles. So-milled, each mixture was then wet with a solution comprising 5.8 percent $NH_4Cl$, 8.6 percent $ZnCl_2$ and 85.6 percent water in a proportion of from 13 to 25 mls. of solution per 100 grams of dry mix, and then tamped into a bobbin 1.375 inch high by 0.47 inch in diameter around a carbon cathode. The wet mixture was separated from the cannister by a thin layer of a paste or gel composition comprising 23.7 percent $NH_4Cl$, 22.3 percent $ZnCl_2$, 0.1 percent $HgCl_2$, 53.9 percent water mixed with starch and flour in a 5 to 1 ratio respectively.

These cells so-made were then subjected to a "high drain test" wherein a continuous discharge at a resistance of 16.7 ohms was applied for the various times required to reduce the cell voltage to the EMF levels indicated in Table II below. Times in hours required to reach these levels for the different cells were recorded and are presented as an average in said table.

TABLE II.—"A" CELL BATTERY TEST
[Continuous drain at 16.7 ohms]

| Type of $MnO_2$ | Drain time in Hours to Reach EMF | | |
|---|---|---|---|
| | 1.3 | 1.2 | 1.0 |
| Carbon seeded (2.7% carbon) | 3.5 | 6.0 | 10.1 |
| Electrolytic | 2.4 | 5.0 | 7.2 |
| Natural ore | 1.2 | 2.6 | 3.7 |

Table II clearly illustrates the superior performance of the present inventive carbon occluded gamma $MnO_2$ over its conventional counterparts providing, among other things, improved conductivity and depolarizing properties. This is so notwithstanding that conventional gamma $MnO_2$ is used in a physical admixture even with, for example, the same Shawinigan carbon as is used to seed the reaction of the present invention. It should be noted again, however, that the Shawinigan carbon used in the present invention is not only in a physical admixture with the other contents of the battery but in addition is occluded in said novel gamma $MnO_2$ itself. The highly desirable results obtained as a consequence of said occluded presence of the carbon in the novel product is clearly shown by the foregoing examples.

It is manifest that various modifications can be made in the process of the present invention without departing from the spirit or scope thereof and it is understood that I limit myself only as defined by the appended claims.

I claim:

1. A gamma type manganese dioxide characterized by the presence therein of occluded micron size particles of carbon having a chain-like structure.

2. The gamma type manganese dioxide of claim 1 wherein the occluded particles are of Shawinigan carbon black.

3. A dry cell battery comprising a gell-lined conductive canister as an anode, a carbon cathode electrode symmetrically spaced from the disposed within said canister, and an electrolyte mixture interposed between the canister and said electrode; said mixture containing ammonium chloride, water, carbon for conductivity, and a depolarizing agent consisting essentially of gamma manganese dioxide particles characterized by the occluded presence therein of micron size, chain-like particles of carbon.

4. The battery of claim 3 wherein the particles of occluded carbon within the gamma manganese dioxide depolarizing agent are of Shawinigan carbon black.

5. A method of preparing gamma $MnO_2$ which comprises: reacting an aqueous solution of a manganese salt, substantially free of impurities, with chlorine in the presence of from about 1.5 to about 10.0 percent by weight of micron sized seed material selected from the group consisting of carbon, carbon occluded $MnO_2$, and gamma $MnO_2$, at an adjusted pH within the range of from about 0.5 to about 3.0, thereby to prepare a gamma form of $MnO_2$ as a precipitate and a liquid phase, said manganese salt being selected from the group consisting of manganese sulfate and manganese chloride; terminating the reaction at a point prior to the formation of detrimental amounts of permanganate ion in the solution phase; separating said precipitate from said solution phase; washing said precipitate so-separated; and drying the washed precipitate.

6. A method of preparing carbon occluded gamma manganese dioxide which comprises: reacting an aqueous solution of a manganese salt, substantially free of impurities, with chlorine in the presence of micron sized particles of carbon, within an adjusted pH range of from about 0.5 to about 3.0, thereby to form a precipitate of gamma manganese dioxide occluded with said carbon and a solution phase, said manganese salt being selected from the group consisting of manganese sulfate and manganese chloride; terminating the reaction at a point prior to the formation of any permanganate ion in the solution; separating said precipitate from the solution phase, washing said precipitate so-separated; and drying the washed precipitate.

7. The method of claim 6 wherein the manganese salt solution contains from about 5 to about 30 percent by weight of said salt.

8. The method of claim 6 wherein the carbon particles are characterized by a chain-like structure.

9. The method of claim 6 wherein the micron sized particles are of Shawinigan carbon black.

10. The method of claim 6 wherein the reaction is carried out at a temperature within the range of from about 25° C. to about 80° C.

11. The method of claim 6 wherein the micron size particles are present in an amount of from about 1.5 to about 10.0 percent, based on the dry weight of the final manganese dioxide product obtained.

12. The method of claim 6 wherein the pH is adjusted to within said range by the addition of a neutralizing agent which will not form an insoluble and inseparable precipitate with the selected manganese salt.

13. The method of claim 12 wherein the neutralizing agent is a magnesium hydroxide slurry when manganese sulfate is employed and calcium hydroxide when manganese chloride is employed.

14. A method of preparing non-hydrated gamma manganese dioxide which comprises: reacting an aqueous solution of from about 5 to about 30 percent by weight of a manganese salt with chlorine at an adjusted pH within the range of from about 0.5 to about 3.0, thereby to form gamma type manganese dioxide and a solution phase, said manganese salt being selected from the group consisting of manganese sulfate and manganese chloride; terminating the reaction at a point prior to the formation of detrimental amounts of permanganate ion in said solution phase; separating said precipitate from the solution phase; washing said precipitate so-separated; and drying the washed precipitate.

References Cited

UNITED STATES PATENTS

| | | | |
|---|---|---|---|
| 2,759,803 | 8/1956 | Dauncey | 23—301 |
| 3,242,013 | 3/1966 | Mehne et al. | 136—138 |
| 3,257,242 | 6/1966 | Euler et al. | 136—138 X |

OTHER REFERENCES

Mrgudich et al., Journal of The Electrochemical Society, vol. 86, 1944, pp. 351–364.

McMurdie, Journal of The Electrochemical Society, vol. 86, 1944, pp. 313–325.

Hamer, Journal of Research of The National Bureau of Standards, Research Paper RP 1870, vol. 40, March 1948, pp. 251–262.

WINSTON A. DOUGLAS, *Primary Examiner.*

A. SKAPARS, *Assistant Examiner.*